US005706417A

United States Patent [19]
Adelson

[11] Patent Number: 5,706,417
[45] Date of Patent: Jan. 6, 1998

[54] LAYERED REPRESENTATION FOR IMAGE CODING

[75] Inventor: Edward H. Adelson, Cambridge, Mass.

[73] Assignee: Massachusetts Institute of Technology, Cambridge, Mass.

[21] Appl. No.: 449,091

[22] Filed: May 24, 1995

Related U.S. Application Data

[63] Continuation of Ser. No. 384,246, Feb. 6, 1995, which is a continuation of Ser. No. 888,801, May 27, 1992.

[51] Int. Cl.$^6$ ........................................................ G06T 3/00
[52] U.S. Cl. .......................... 395/129; 395/135; 395/174
[58] Field of Search ...................................... 395/128, 129, 395/135, 152, 164, 173, 174, 175, 960; 345/113, 114, 122; 382/236

[56] References Cited

U.S. PATENT DOCUMENTS

| | | | |
|---|---|---|---|
| 4,661,986 | 4/1987 | Adelson | 382/154 |
| 4,951,229 | 8/1990 | Dinicola et al. | 395/173 |
| 5,003,491 | 3/1991 | Heckt | 395/135 X |
| 5,041,992 | 8/1991 | Cunningham et al. | 395/135 |
| 5,046,026 | 9/1991 | Tolomei | 395/173 |
| 5,103,305 | 4/1992 | Watanabe | 382/236 |
| 5,177,796 | 1/1993 | Feig et al. | 382/236 |
| 5,179,639 | 1/1993 | Taaffe | 395/128 |
| 5,214,758 | 5/1993 | Ohba et al. | 395/173 |
| 5,243,693 | 9/1993 | Maron | 395/135 |
| 5,261,041 | 11/1993 | Susman | 395/173 |
| 5,305,400 | 4/1994 | Butera | 382/236 X |
| 5,533,181 | 7/1996 | Bergsneider et al. | 395/152 |

OTHER PUBLICATIONS

Tu et al., "Low bit–rate image coding based on evaluation of motion sequence", Proceedings of SPIE, Applications of Digital Image Processing XII, vol. 1153, Aug. 11, 1989.

Darrell et al., "Discontinuity Models and Multi–Layer Description Networks" M.I.T. Media Lab Vision and Modeling Group Technical Report No. 162, Jul. 1991.

Adelson, E.H. & Anandan, P. Ordinal Characteristics of Transparency, AAAI Workshop on Qualitative Vision, Boston, MA (1990).

Girod, B. & Kuo, D. Direct Estimation of Displacement Histograms, Pro. Image Understanding and Machine vision Workshop, Cape Cod, MA pp. 73–76 (1989).

Bergen, J., Burt, P., Hingorani, R., & Peleg, S., Computing Two Motions From Three Frames, Proc. 3rd ICCV, Osaka, Japan, pp. 27–32 (1990).

Black, M., & Anandan, P., A model For The Detection of Motion Over Time, Prov. 3rd ICCV, Osaka, Japan (1990).

Kersten, D., Transparency and the Cooperative Computation of Scene Attributes, in Landy, J., and Movshon, J. eds., Computational Models of Visual Processing, MIT Press (1991), pp. 209–228.

Williams, L.R., Perceptual Organization of Occluding Contours, Proc. 3rd ICCV, Osaka, Japan, 133–137 (1990).

Lin, H.D., & Messerschmitt, D., Video Composition Methods and Their Semantics, IEEEECASSP (1991), pp. 2833–2836.

Gerbino, W., Stultiens, C.I.F.H.J., Troost, J.M. & deWeert, C.M.M. Transparent Layer Constancy, Journal of Experimental Psychology Human Perception and Performance vol. 16, No. 1, 3–20 (1990).

Metelli, F., The Perception of Transparency, Scientific American pp. 36–43 Apr. 1974.

Foley, vanDam, Feiner & Hughes, *Computer Graphics Principles and Practice*, pp. 835–843 (1990).

*Primary Examiner*—Mark K. Zimmerman
*Attorney, Agent, or Firm*—Wolf, Greenfield & Sacks P.C.

[57] ABSTRACT

A moving image representation format and encoding and decoding techniques. In the format, the image is represented as a series of layers, each layer comprising one or more maps containing information about the image. In decoding the information, the maps are combined in an order dictated by their ordinal depth in the image. Each layer comprises 1) an intensity map representing the intensity of the pixels in that layer, 2) an attenuation map by which the image intensities of the layers below it are multiplied while the intensity map corresponding to its layer is multiplied by its complement, 3) a delta map that describes the temporal derivative of the points in the corresponding intensity map, and 4) a velocity map which describes how all points in the layer are warped over time.

27 Claims, 9 Drawing Sheets sequence [struct] —71
    name [charstring] —72
    sub - sequence - list [pointer] —74 sub - sequence [struct] —81
    name [charstring] —75
    duration - secs [float] —76
    layer - list [pointer] —78
    next - sub - sequence [pointer] —80 layer [struct] —83
    depth - order [integer] —82
    map - list [pointer] —84
    next - layer [pointer] —86 map [struct] —87
    evaluator [pointer] —88
    data [pointer] —90
    next - map [pointer] —92

FIG. 6A

3349
sequence —71
    name : "demo" —72
    sub - sequence - list :  # 78352 —74

---

78352
sub - sequence —81
    name :  "wall" —75
    duration - secs :  1.0 —76
    layer - list :  # 2443 —78
    next - sub - sequence :  # 3349 —80

---

2443
layer —83
    depth - order :  0 —82
    map - list :  # 22345 —84
    next - layer:  # 5522 —86

---

22345
map —87
    evaluator :  # 55334 —88
    data :  #44390 —90
    next - map :  # 44223 —92

---

55334
evaluator —94
    name :  "linear - funct" —96
    results = a*x + b*y + c*t —98

---

44390
data —99
    a :  3.0
    b :  1.5
    c :  0.33

LAYERED REPRESENTATION FOR IMAGE CODING

This application is a continuation of application Ser. No. 08/384,246, filed Feb. 6, 1995, which is continued from Ser. No. 07/888,801, filed May 27, 1992.

FIELD OF THE INVENTION

The invention pertains to a method and apparatus for encoding, representing and decoding sequences of related image information, such as sequential frames of a scene containing movement, for digital storage or manipulation. More particularly, the invention pertains to a method and apparatus for image coding in which significant data compression is achieved.

BACKGROUND OF THE INVENTION

Various techniques are known for encoding image information into a digital representation which can be stored in computer memory or manipulated digitally. Transform coding, sub-band coding, and vector quantization are some of the well known techniques that have been used to encode still and moving images. In the case of moving image sequences, these techniques are often used in conjunction with frame differencing or motion compensation to take advantage of the temporal structure of image sequences and the visual similarity of sequential frames of an image sequence.

Any image coding technique comprises a representation format, i.e., a way to describe the images. The technique must also comprise a means for encoding the image pixel data into the representation format and a means for decoding from the representation format back into an array of pixels for display.

One goal of image encoding is to reduce the amount of memory needed to store the image information. Each frame of a television image may comprise thousands of pixels and, at 30 frames per second, for instance, a 30 second scene comprises almost 1,000 frames. Accordingly, image coding techniques are designed so as to encode the data into a form requiring less memory than if the data for each pixel element of each frame were individually stored. Accordingly, a main reason for image coding is to achieve data compression.

It is also desirable for the coding technique to allow the stored data to be manipulated easily to achieve special effects with the image.

In prior art moving image coding techniques, the contents of a frame sometimes are estimated by applying a spatial transformation to the contents of a previous frame. One well known technique of moving image coding is block-matching. In block-matching, a given block of pixels in one frame is estimated as The rigidly translated block from a previous frame. If the coding correctly estimates the block in the new frame, only the translation vector is needed to describe perfectly the new frame in terms of the preceding frame. If the estimate is not perfect, additional data is required in the form of error data which corrects the imperfection. More sophisticated methods can code data concerning smooth distortions, including affine transformations or rubber-sheet warps.

Block-matching, as well as more sophisticated related techniques, are based on the assumption that the optical flow field is smooth and single-valued. This assumption, however, is frequently violated. For instance, when an object in the foreground obstructs an object in the background, the flow field is discontinuous at the boundary of the obstructing object. As the frames advance, pixel data at the leading edge of the moving object disappear while pixel data at the trailing boundary of the moving object appear. The pixel data at the leading and trailing edges of the obstructing object cannot be coded correctly by these techniques and must be explicitly coded with error data. This increase in the need for error data leads to inefficient coding.

The block-matching type techniques also are unable to code properly images having transparent motion. Transparent motion occurs when there are two valid motion vectors at the same location in an image. For example, transparent motion exists where a camera records a scene viewed through a window pane in which dirt or specular reflections on the pane are combined with the scene. Multiple motion vectors also exist where the edge of a moving foreground object is blurry, as may be due to lack of focus or motion blur. In either of these situations, the blurred edge of the moving object combines with the background in a semi-transparent manner such that there are two different valid motions in the blurred region.

Therefore, it is an object of the present invention to provide an improved moving image encoding, representation, and decoding technique.

It is a further object of the present invention to provide a technique for representation of a sequence of moving images which achieves significant data compression.

It is another object of the present invention to provide a moving image representation technique adapted to represent multiple motion vectors at the same image location.

It is yet one more object of the present invention to provide a moving image representation technique in which the image can be easily altered to achieve special effects or temporal interpolation.

SUMMARY OF THE INVENTION

The invention comprises a technique and apparatus for encoding pixel information of a sequence of frames of a still or moving image into a compressed representation and a technique of decoding the compressed representation back into pixel information. The image is represented as a series of n layers ordered by "depth" in the image, each layer comprising a series of data maps. Preferably, although not necessarily, a layer exists for each object, set of objects, or portion of an object in the image having a motion vector significantly different from any other object in the image. Each map comprises a set of data for discrete two dimensional locations, (x,y). Some maps may also include time (t) as a third dimension. The data for the two spatial dimensions comprise a spatial sampling lattice which may or may not correspond to the original image's pixel resolution. The time parameter typically, but not necessarily, corresponds to the frame rate.

Each layer typically comprises the following maps:

1.) an intensity map, E(x,y,t), essentially defining the image comprising that layer at a fixed instant in time, e.g., the initial frame of the sequence,
2.) an attenuation map, A(x,y,t), which defines the attenuation at each point of all underlying layers and the complement of which defines the attenuation at each point of the corresponding layer,
3.) a velocity map, V(x,y,t), which describes how all points in the layer are warped over time, and
4.) a delta map, D(x,y,t), which describes the temporal derivative of points in the intensity map of the corresponding layer.

The ordering (i.e., ordinal depth) of the layers is either stored in memory as separate data or the data structure in memory may be such that the ordinal depth of each layer is known directly from the data structure so that the layers can be combined during decoding in the proper order.

Optional maps include (1) a contrast change map, C(x,y,t), which describes how the intensity map of the corresponding layer should be multiplied to create contrast transitions over time, (2b) a blur map, B(x,y,t), which may be used to add motion-blur or focus-blur to each point in the intensity map of the corresponding layer, (3) a depth map, Z(x,y,t), indicating the physical distance of each point in the layer from the camera, and (4b) a surface orientation map, N(x,y,t), which codes the surface normals.

It is not necessary that all of the maps be sampled on the same lattice in space and time. Any number of maps may have different spatial and/or temporal resolutions. Further, an image larger than any single frame image, such as may be traversed by a camera panning over a scene, can be represented by a space lattice larger than any given actual frame image. Interpolation rules can be provided to synthesize any portion of the scene at any time even though an actual recording of the particular portion of the scene at the particular time may never have been made.

BRIEF DESCRIPTION OF THE DRAWING

In the drawing:

FIG. 6A is a table illustrating an exemplary data structure for storing image data of the present invention in memory.

FIG. 6B is a pictorial representation of a memory device containing data stored in the representation format of the present invention.

DETAILED DESCRIPTION OF THE INVENTION

The present invention comprises a method and apparatus for encoding, representing, and decoding moving image information as a set of overlapping layers. The number of layers is a function of the number of different motion vectors in the image and typically, although not necessarily, the ordinal depth of layers is a function of physical depth of the object, set of objects or portion of an object (hereinafter simply object) comprising that layer.

Figure 1:
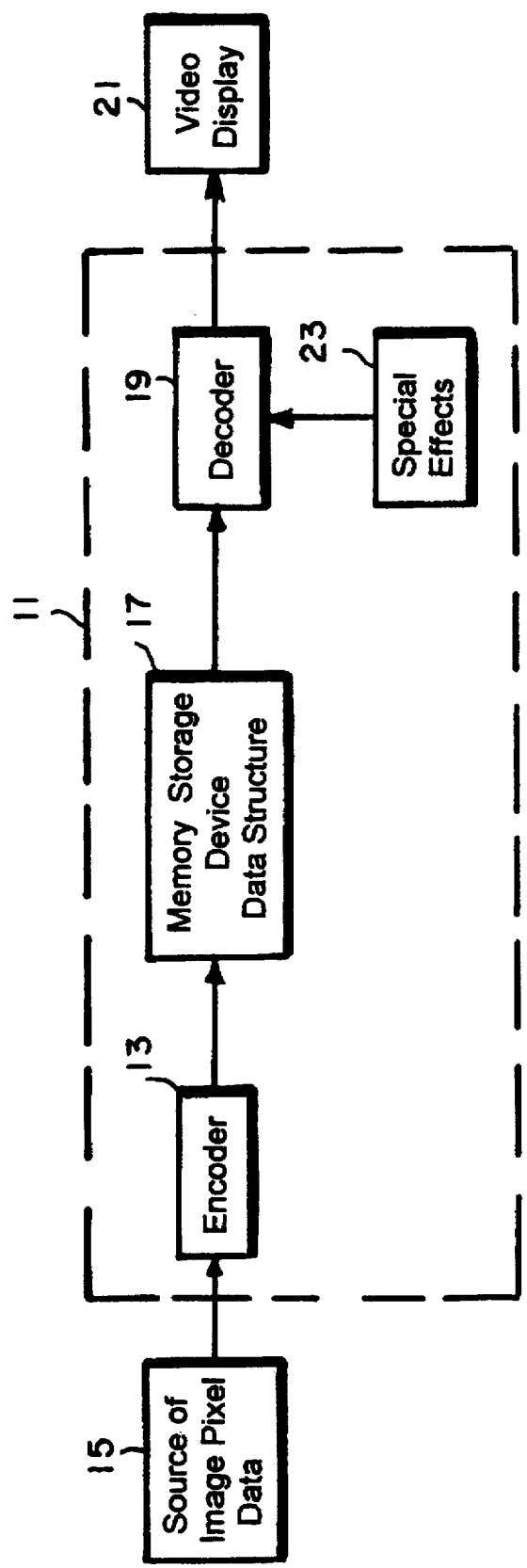
FIG. 1 is a block diagram of the apparatus of the present invention.

FIG. 1 is a block diagram of the apparatus of the present invention. The present invention is enclosed within dashed box 11. It comprises an encoder 13 which receives data from a source of image pixel data 15, such as a video tape player, laser disc player or camera. The encoder 13 encodes the incoming pixel data into a data structure in accordance with the present invention for storage in memory storage device 17. In order to reconstruct the image for re-display from the data stored in memory storage device 17, the data is sent to decoder 19 which reconverts the stored data in accordance with the present invention back into pixel data for display on video display monitor 21. As explained more fully herein, the data can be manipulated in the decoding stage by special effects circuitry 23 in order to achieve special effects such as frame rate conversion and motion vector alteration.

The technique of the present invention operates on the principle that a still or moving image can be broken down into a plurality of layers. Commonly, a layer will be provided for each object or series of objects in the image which has a motion vector substantially different than any other object or series of objects in the image. For instance, an image of a baseball player chasing a flyball might comprise three layers; 1) a stationary background (i.e., the field), 2) the baseball player, and 3) the baseball. It is also possible that the baseball player may comprise several layers instead of just one, such as a layer for each leg and each arm.

Each layer comprises a series of maps, each map comprising, or being convertible into, a two-dimensional array of data points partially defining the portion of the image comprising that layer. The spatial resolution (or spatial sampling lattice) of the array need not correspond to the pixel resolution of the image which has been recorded. In fact, the maps of different layers or different maps in any single layer may have different resolutions both spatially and temporally. Further, the data in the maps can be temporally and/or spatially interpolated as needed to generate an image of any desired temporal or spatial resolution. In fact, interpolation can be used to provide a different spatial resolution and/or frame rate in the output image than that of the input image.

Each layer typically will comprise at least 1) an intensity map, 2) an attenuation map, 3) a velocity map and 4) a delta map.

The intensity map, E(x,y,t) essentially comprises a still image of a portion of the total image sequence. As will be made clear by the explanation hereinafter, the intensity map of a given layer, when multiplied by the attenuation maps of the all overlying layers as well as by the complement of the attenuation map of its corresponding layer creates a still image of the corresponding layer. The intensity map, taken alone, does not actually comprise a still image of the corresponding layer.

The attenuation map, A(x,y,t), describes the attenuation of all layers underlying the layer corresponding to a given attenuation map. The attenuation maps essentially serve the function of erasing the portions of the intensity maps underlying that layer which are occluded by objects in that layer.

The velocity map, V(x,y,t), describes how the points in a layer are warped over time. A velocity map can be used to describe any smooth vector field, and, therefore, can be used to define not only translations, but also shear, rotation, dilation, etc.

The delta map, D(x,y,t), describes the temporal derivative of all points in the intensity map of the corresponding layer. The delta map is essentially an additive error map which provides correction data for any changes in the image over time which cannot be accounted for by the other maps. Accordingly, with use of a delta map in the layered representation technique of the present invention, essentially perfect image reconstruction can be achieved since the delta map can correct for any errors caused by the imperfection of other maps. As the art of performing the layered analysis disclosed herein improves, the amount of information which must be stored in delta maps will decrease.

Any layer may also include 1) a contrast change map, $C(x,y,t)$, which describes how the intensity map of the corresponding layer should be multiplied to account for contrast changes in the image, 2) a blur map, $B(x,y,t)$, which can add motion blur or focus blur to each point in the intensity map of the corresponding layer, 3) a depth map, $Z(x,y,t)$, describing the physical depth of each point in the layer and 4) a surface orientation map, $N(x,y,t)$, which codes the surface normals.

The present invention is extremely flexible and can be used to easily create many types of special effects. The invention will be described more specifically with respect to the following examples.

Single Frame Example

Representation Format

Figure 2:
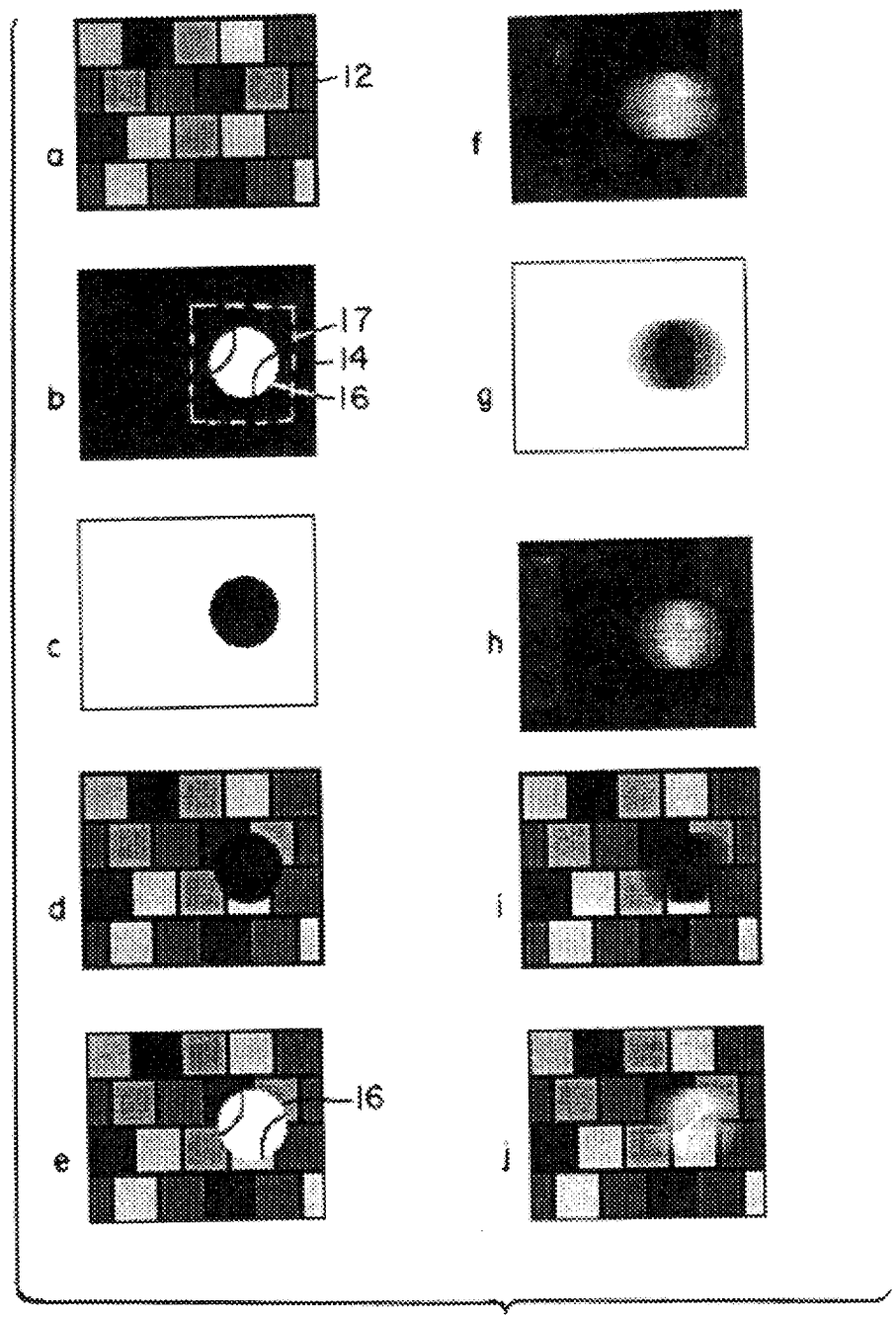
FIG. 2 is a series of visual representations of various maps or combinations of maps used in the representation technique of the present invention.

FIG. 2 illustrates the layered representation technique of the present invention with respect to a single frame of a scene in which a baseball 16 is traveling across a stationary background 12 comprising a multi-colored block wall. For the purposes of this simplified example, motion of the baseball is ignored. Frame a of FIG. 2 pictorially shows an intensity map of the background layer comprising a series of different colored blocks upon which the camera is fixed. The background image is mapped as a spatial lattice, by any one of a number of conventional techniques, into an intensity map $E_0(x,y)$. In is simplest form, the intensity map may comprise a two dimensional array in memory with data stored for each point in the array. If the image is in color, each point in the map $E_0(x,y)$ would be represented by a three dimensional vector, (e.g., red, green, blue), i.e., it would comprise a three dimensional array in which the third dimension is three units deep. The resolution of the array may or may not be selected to correspond to the pixel resolution of the image which is being represented.

Where possible, a map may be stored not as an array but as a mathematical function of the two dimensions, x and y, in order to achieve data compression. For instance, if in a color image, a particular layer was all one color, the entire layer could be represented by three numbers (corresponding to the intensity of each of the red, green and blue components) preceded by a flag indicating the significance of the three numbers stored in the map.

Various other data compression techniques may also be employed to reduce the quantity of data needed to describe the maps. Such techniques may include DCT, sub-band coding, run-length coding and vector quantization.

Frame b of FIG. 2 pictorially shows the intensity map, $E_1(x,y)$, of the foreground layer 14 of the scene, which comprises baseball 16. The baseball layer maps may, but need not, define an array the size of the image. A smaller map such as represented by reference numeral 17 in frame b of FIG. 2 with fewer points may be utilized as long as its position in the larger image is defined.

In order to achieve proper combination of the background layer intensity map, $E_0$, with the foreground layer intensity map, $E_1$, the portion of the background image which would be occluded by the baseball 16 must be deleted, i.e., made black. This is accomplished with an attenuation map, $A_1(x,y)$, illustrated in frame c of FIG. 2, corresponding to the foreground layer. The attenuation map comprises values between zero and unity corresponding to the amount of attenuation at a given point, unity being no attenuation and zero being full attenuation.

For the moment, it is assumed that there is no motion-blur or focus-blur near the edge of the baseball. Accordingly, points on the attenuation map corresponding to the position of the baseball have a value of zero, corresponding to full attenuation, i.e., elimination of the image of the underlying layer(s) at that location, and unity, indicating no attenuation of the underlying layer(s), at all other points.

The attenuation map, in particular, typically will not be represented in memory as an array containing data for every point in the spatial lattice, but will be stored as a function or series of functions which can be used to derive the attenuation at any point in the array. For instance, if, in a given layer, the right half of the scene is black and the left half of the scene is white, it is not necessary to store data for each point in the spatial lattice of the scene because the scene could be described by a few numbers and a flag indicating the mathematical equation into which the numbers can be inserted to obtain the map as a function of the two-dimensional coordinates x and y.

Decoding

Once the data is stored in memory as a series of layers, each comprising a series of maps, the data can be retrieved easily to reconstruct the image. The intensity map of the background layer $E_0(x,y)$ is multiplied by the attenuation map corresponding to the foreground layer, $A_1(x,y)$. This results in the removal of the region of the background layer occluded by the baseball, thus producing the modified background shown in frame d of FIG. 2. The foreground image is multiplied by the complement of the attenuation map, $(1-A_1(x,y))$. In the simplified example used here, where the foreground layer is black except for the baseball 16 (i.e., comprises only the baseball), this results in no change in the intensity map corresponding to the baseball layer, $E_1(x,y)$. The two layers, as affected by the attenuation map, are thus shown by frames b and d of FIG. 2. The summation of frames b and d results in the image shown in frame e in FIG. 2. The compositing of the two layers to form the image, I, can be described by the equation:

$$I(x,y)=E_0(x,y)A_1(x,y)+E_1(x,y)(1-A_1(x,y))$$

In actual recorded images, there is likely to be at least motion-blur if not also focus-blur such that, at the edge of the baseball, the image will partially consist of the blurred baseball and partially consist of the background scene. In this situation, points in the attenuation mask must take on values between 0 and 1. For instance, frame f of FIG. 2 shows an intensity map $E_1'(x,y)$ for a more realistic foreground layer in which the baseball appears spread out because of motion blur. Frame g shows the attenuation map $A_1'(x,y)$ corresponding to the motion blur where array values between 0 and 1 exist near the edges of the baseball. When image f is combined with image g, in these regions, the background layer partially will show through the foreground layer. Frame i in FIG. 2 illustrates the image created by the multiplication of the background intensity map, $E_0(x,y)$, with the foreground attenuation mask, $A_1'(x,y)$. As in the first example, the complement of the attenuation map, $(1-A_1'(x,y))$, is combined with the foreground intensity map, $E_1(x,y)$, to produce image h. The composite final image resulting from the addition of the two layers is shown in frame j of FIG. 2.

The above-described processing stages can be applied to combine any number of layers to achieve a composite image.

Figure 3:
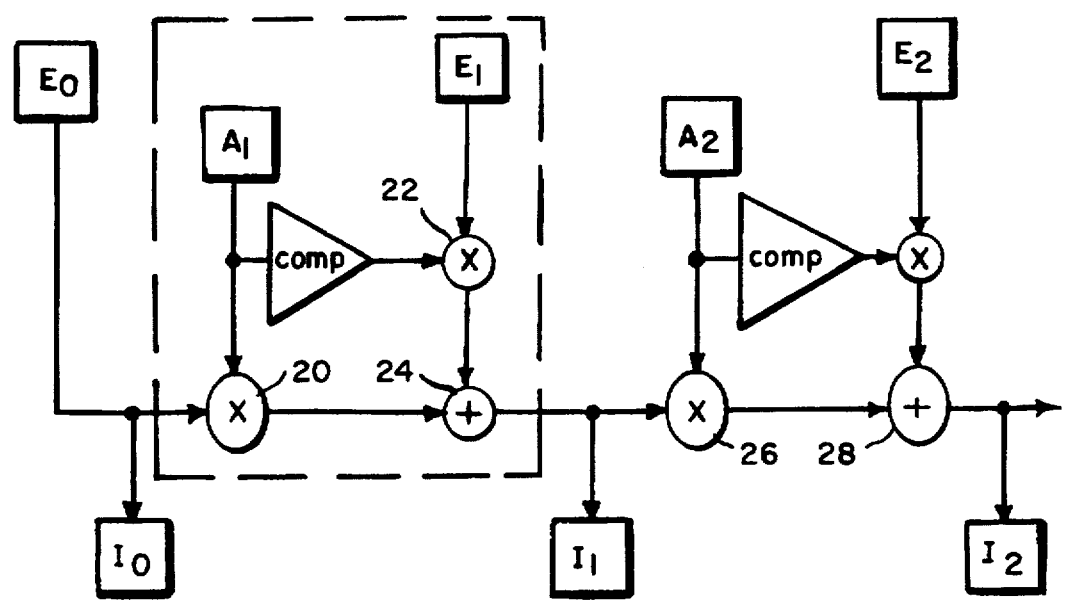
FIG. 3 is a flow diagram illustrating a simplified decoding process of the present invention.

FIG. 3 is a flow chart illustrating the technique for decoding (or compositing) a complete image from the maps (i.e., decoding the maps) as described above. The intensity map of the deepest layer of the image, $E_0$, is multiplied at 20 by the attenuation map, A1, of the next deepest layer to produce $E_oA_1$. The intensity map, $E_1$, corresponding to the next deepest layer is multiplied at 22 by the complement of the attenuation map $A_1$ to produce $E_1(1-A_1)$. $E_0A_1$ is added to $(1-A_1)E_1$ at 24 to produce image $I_1$. $I_1$ would then be combined with any additional layers in the same manner. For instance, $I_1$ would be multiplied by the attenuation map, $A_2$, of the next layer at 26 and then added to the intensity map of that layer after it has been multiplied by the complement of $A_2$, as illustrated at 28. This combination results in composite image $I_2$ which, if there are no more layers comprises the final image, or otherwise continues in the flow chart for combination with further layers.

Moving Image Example

The foregoing example illustrated how the layering technique of the present invention can be used to produce a single frame image. These same concepts can be extended to a technique for encoding, representing and decoding moving images over a series of frames.

Representation Format

Figure 4:
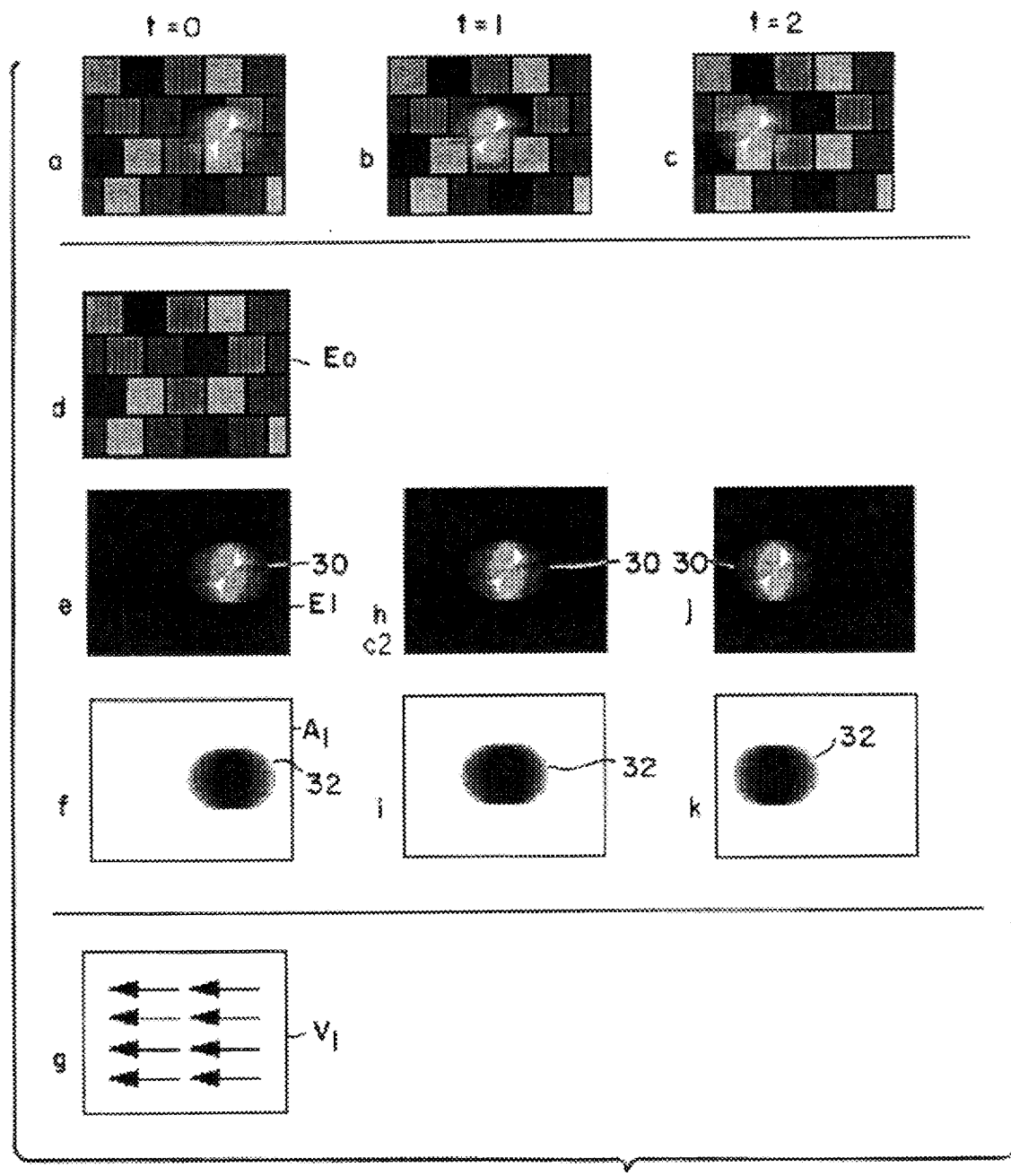
FIG. 4 is a second series of visual representations of various maps or combinations of maps used in the image representation technique of the present invention.

If the baseball of the prior example is translating across the scene, then it will produce a series of images as shown sequentially in FIG. 4 as frames a, b, and c. In this example, the background is stationary and the ball moves across the background from right to left in the three frames.

The sequence of frames at times t=0, 1 and 2, shown in frames a, b and c of FIG. 4 can be represented by the four maps which are visually illustrated in FIG. 4, frames d, e, f, and g. Frame d illustrates the intensity map, $E_o(x,y)$, of the stationary background layer, as in the prior example. Frame e illustrates the intensity map, $E_1(x,y)$, of the baseball image, also as in the prior example. Frame f illustrates the attenuation map, $A_1(x,y,t)$, corresponding to the baseball layer, also as in the preceding example. Frame g illustrates a velocity map, $V_1(x,y,t)$, which defines the direction and speed of movement of the intensity map, $E_1(x,y)$, and attenuation map, $A_1(x,y)$, of the corresponding layer. For purposes of this example, the velocity of the baseball is assumed constant over the time period t=0 to t=2. Accordingly, velocity map $V_1(x,y,t)$ can be encoded as a single, simple mathematical function. In the example of FIG. 4, the velocity map corresponds to the baseball layer and is applied to the baseball layer intensity map and the baseball layer attenuation map. The velocity map, $V_1$, is preferably scaled to the frame such that velocity is given as a function of the frame period.

The velocity map can be used to define any smooth vector field transformation (or warping) of a layer such as, translation, location, sheer and dilation. Significant data compression can be achieved by defining the velocity map as a mathematical function or series of mathematical functions as opposed to a two dimensional array.

The symbol, *, will be used herein to denote the warping operation of the velocity map (i.e., smooth vector field transformation) on another map. It should be understood that the * symbol is not intended to denote multiplication since the velocity map is not multiplied with the other maps but warps the other maps as discussed above.

Decoding

The combination of maps $E_o$, $E_1$, $A_1$ and $V_1$ at time t=0 (frame 0) results in the first frame image shown in frame a of FIG. 4. At time t=0, velocity map $V_1$ warps the other maps zero times, i.e., leaves them unaltered. However, at time t=1 (frame 1), maps $E_1$ and $A_1$ are warped by map $V_1$ one unit amount to shift the contents of those maps, i.e., baseball 30 and corresponding spot 32, respectively, towards the left. The result of $V_1*E_1$ at t=1 is illustrated in frame h of FIG. 4, while the result of $V_1*A_1$ at t=1 is illustrated in frame i of FIG. 4. Accordingly, at time t=1, the combination of maps $E_o$, $E_1$, $A_1$ and $V_1$ by $$E_o[V_1(x,y,1)*A_1]+V_1(x,y,1)*[E_1(1-A_1)]$$

results in frame b as shown in FIG. 4. Finally, at time t=2, $V_1$ warps maps $E_1$ and $A_1$ two unit amounts. As noted above, the velocity of the baseball is assumed to be constant. Accordingly, the value of map $V_1$ at time t=2 is simply twice the value of $V_1$ at time t=1 or, in equation form, $$V_1(x,y,2)=2V_1(x,y,1)$$

Therefore, at time t=2, the baseball image intensity map and corresponding attenuation map are shifted further to the left resulting in frames j and k, respectively. The combination $$E_o[V_1(x,y,2)*A_1]+V_1(x,y,2)*[E_1(1-A_1)]$$

results in the composite image shown in frame c of FIG. 4.

Complex Motion Example

Representation Format

In the preceding example, the motion was a simple translation of a foreground layer across a background layer which could be represented as a straight line function. If the velocity or direction of the ball were to change during the scene, then a more complex function would comprise map $V_1$. One could also use affine transformations in order to represent rotation, dilation, and shearing of a layer. One could use even more complex warp maps to achieve arbitrary distortions.

A velocity map commonly will not contain all the information necessary to convey changes occurring in a given layer. Accordingly, some layers may also comprise a delta map (change map). The delta map defines the temporal derivative at each point in the corresponding layer, i.e., an additive correction. Thus, in addition to undergoing a warp from one frame to the next as dictated by a velocity map, a layer can be combined with an additive correction as dictated by a delta map.

Decoding

Figure 5:
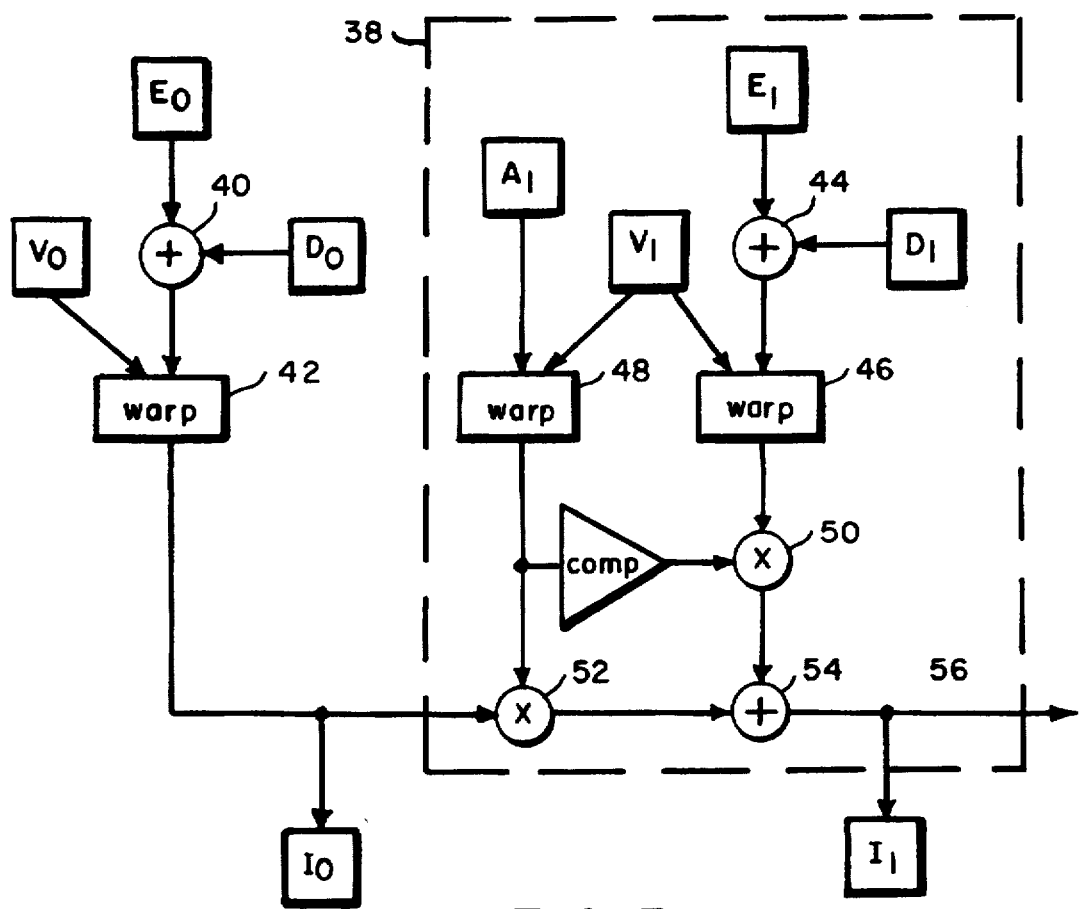
FIG. 5 is a second flow diagram of the decoding process of the present invention.

FIG. 5 is a flow chart illustrating the compositing of maps for an exemplary complex system which includes velocity maps and delta maps. FIG. 5 illustrates a two layer system with all the components which correspond to a single layer enclosed in exemplary block 38. A block such as block 38 exists for each layer. The intensity map of the background layer, $E_0$, is additively modified at 40 by a delta map, $D_0$, corresponding to that layer. The combination is then warped by the velocity map corresponding to that layer, $V_0$, as shown at 42.

The resulting changed, warped and attenuated background image, $I_0$, is then added to the composite of maps of the second layer. In particular, the intensity map of the second layer, $E_1$, is combined at 44 with the delta map, $D_1$, corresponding to that layer. That combination is then warped by corresponding velocity map $V_1$ at 46. An attenuation map corresponding to this layer, $A_1$, is also warped by the velocity map $V_1$ as shown at 48. The warped intensity image previously generated at 46 is then multiplied by the complement of the attenuation map at 50, while the warped and changed background layer image $I_0$ is multiplied by the original attenuation map at 52.

The changed, warped and attenuated background image is then added to the changed, warped and attenuated foreground image at 54 to produce combined image $I_1$. If the desired final image includes additional layers, for each additional layer, additional decoding steps such as comprises box 38 would appear subsequent to line 56 containing image $I_1$.

Encoding Images

Having described the representation technique and the decoding technique, an encoding technique for a special case will now be described. The encoding process is non-unique. There are innumerable ways of representing a given image sequence within the constraints of the representation format described herein.

A method has not yet been derived for determining the optimal encoding technique of a given image sequence. However, current encoding techniques are viable and, when used with the representation format of the present invention, offer distinctive advantages over prior art image encoding, representation and decoding techniques.

One particular procedure for converting an image sequence into the layered representation format of the present invention is described below. This technique is useful to illustrate one viable encoding method, though it is not the most general.

Suppose that a foreground object, with intensity map $F(x,y,t)$ moves in front of a background with intensity map $G(x,y,t)$, and that they are combined with an attenuation map $A(x,y,t)$. The observed image $I(x,y,t)$ is given by:

$$I(x,y,t)=A(x,y,t)G(x,y,t)+(1-A(x,y,t))F(x,y,t))$$

Now suppose that the foreground is transformed, from frame to frame, by a warp operator (e.g., a velocity map) $P(x,y,t)$, and that the background is transformed by $Q(x,y,t)$, so that $$F(x,y,t)=P(x,y,t)*(F(x,y,0))$$

$$G(x,y,t)=Q(x,y,t)*(G(x,y,0))$$

which may be expressed in the simplified notation, $$F_t=P_t*F_o$$

$$G_t=Q_t*G_o$$

The attenuation map is transformed in parallel with the foreground intensity map, so that $$A(x,y,t)=P_t*(A(x,y,0))$$

$$A_t=P_t*A_o$$

The sequence is then:

$$I_t=A_tG_t+(1-A_t)F_t$$

We can then stabilize the foreground and the attenuation map by applying an inverse warp delta map, $p^{-1}$, leading to:

$$P_t^{-1}I_t=A_oP_t^{-1}G_t+(1-A_o)F_o$$

Now, if $I_t^*$ is defined as $$I_t^*=P_t^{-1}*I_t$$

and $G_t^*$ is defined as $$G_t^*=P_t^{-1}*Q_t*G_o,$$

then $$I_t^*=A_oG_t^*+(1-A_o)F_o.$$

If the warps P and Q, and the background $G_o$ are known, $A_o$ can be determined for two different frames taken at t1 and t2, as follows:

$$I_{t1}^*-I_{t2}^*=A_o(G_{t1}^*-G_{t2}^*)$$

and thus, $$A_0=\frac{I_{t1}^*-I_{t2}^*}{G_{t1}^*-G_{t2}^*}$$

Thus, $A_o$ can be determined from the known quantities on the right hand side of the equation. Once $A_o$ is known, $F_o$ can be determine by plugging $A_o$ back into the original equation.

Since the solution will be unstable when the denominator is near zero, it will be advantageous to make multiple observations at multiple times and to obtain a least squares solution:

$$A_0=\frac{\sum_{n,m}(I_n^*-I_m^*)(G_n^*-G_m^*)}{\sum_{n,m}(G_n^*-G_m^*)^2}$$

Data Structure in Memory

FIG. 6A illustrates, in pseudo-code, one exemplary data format for storing the map data in memory. FIG. 6B shows the data format of FIG. 6A containing exemplary data. In this format, the image sequence comprises a series of sub-sequences. Generally a new sub-sequence exists for each time the scene changes significantly enough to require generation of a new set of intensity maps. For instance, a moving image sequence may comprise a series of different scenes, e.g., 1) a view from behind a pitcher in a baseball game as he throws the ball towards the batter, followed by 2) a view from behind the batter as he hits the ball, followed by 3) a close-up of a fielder catching the ball.

As shown in FIG. 6A, the data defining an image sequence is stored in memory as a combination of four different types of data structures, namely, 1) sequences, 2) sub-sequences, 3) layers, and 4) maps. Each sequence comprises one or more sub-sequences, each sub-sequence comprises one or more layers, and each layer comprises one or more maps.

In FIG. 6A, the following abreviations are used:

struct=a structure (as in a computer language), charstring=a string of ASCII characters, float=a floating point number, integer=a fixed point number, pointer=a pointer to another data structure.

In addition, an "evaluator" is a value of the map for arbitrary choices of x, y and t. There is a data block associated with each evaluator containing the data needed by that evaluator. For example, the evaluator could be identified as a linear interpolater, in which case the associated data block would consist of a set of x, y and t samples. As another example, the evaluator could be an affine function, in which case the data block would consist of the six affine parameters. As a further example, if the evaluator was a JPEG decoder with cubic interpolation, the data block would comprise a sequence of JPEG encoded images.

As shown in FIGS. 6A and 6B, a name 72 is given to each sequence 71, such as "demo". Each sequence comprises a sup-sequence list pointer 74 to the first address of the first sub-sequence which comprises that sequence. Sequence "demo" comprises first sub-sequence "wall" 81, the data pertaining thereto which is stored begining at memory location 78,352. Alternately, the data can be stored in a particular format such that pointers are unnecessary and the purpose of the data is known from its location.

Each sub-sequence comprises data defining the name 75 of the sub-sequence, floating point data 76 defining the duration of the sub-sequence, and the beginning address 78 of the data for the first layer in the sub-sequence. The general color format of the sub-sequence could also be included as a separate piece of data. Typically, the color data would indicate whether the sub-sequence is black and white or color so that it is known whether the intensity map data is a three dimensional vector (i.e., red, green, blue) or a single value for each point in the map.

Each sub-sequence also includes a pointer 80 to the first address of the next sub-sequence.

As illustrated in FIG. 6B, the first sub-sequence is named "wall," has a duration of one second and comprises at least a first layer, the data of which is stored beginning at memory location 2443. Pointer 80 provides the beginning address of the data of the next sub-sequence in sequence "demo".

Data is stored for each of the layers comprising each sub-sequence. For instance, the data pertaining to the first layer in sub-sequence "wall" is stored in memory beginning at memory location 2443. The data stored for each layer comprises 1) the layer's depth order 84 in the sub-sequence, 3) a pointer 85 to the beginning location of the data for the first map in that layer and 3) the beginning address of the data for the next layer of sub-sequence "wall".

Following the layer information is the specific information necessary to define each individual map in the layer. As shown in FIGS. 6A and 6B, information in each of the following categories is stored for each map, such as map 87:

1) a pointer 88 to the beginning address of the evaluator for that map;

2) a pointer 90 to the beginning address of the data block pertaining to the evaluator; and 3) a pointer 92 to the beginning memory location of the data pertaining to the next map in that layer.

The data for evaluator 94 comprises 1) the name 96 of the evaluator and 2) the function 98. The data block 99 pertaining to that evaluator comprises data needed by the evaluator. For instance, evaluator 94 is a linear function comprising the equation a*x+b*y+c*t. Accordingly, the data block 99 must provide the values of a, b and c as shown in FIG. 6B.

FIGS. 6A and 6B show only a portion of an exemplary data structure pertaining to a recorded video image sequence and it should be understood that the actual data for a sequence would comprise additional maps, layers and sub-sequences. It should further be understood that additional data items may be stored with respect to each sequence, sub-sequence, layer or map. For instance, for each map, data may be stored as to the map type, the sampling rate defining the resolution of the map, and spatial and temporal interpolation methods for the maps.

Alternate Embodiments And Discussion

Several additional maps also may be employed. For instance, a contrast change map, C(x,y,t), can be used to specify how the intensity of an entire frame should be multiplied to make the transition from one frame to the next in the sequence. A blur map, B(x,y,t), can also be used to add motion-blur or focus-blur to points in the intensity map of the corresponding layer. The blur map would contain a set of parameters for a space variant filter that is to be applied at each point in the image. In its simplest form, the filter may be a fixed kernel for the entire layer.

An orientation map, N(x,y,t), can also be used to code surface normals (also known as a bump map).

In a preferred embodiment, a depth map Z(x,y,t), is generated for each layer. If information is available as to the physical depth (sometimes termed metric depth) of the various points in the array of a layer, then such information may be stored in a depth map. Depth information about the points in a given layer will allow for an easier reconstruction of an image. For instance, using the example of the baseball translating but not rotating across an image recorded by a stationary camera, since the portion of the baseball visible to the camera (i.e., a hemisphere) is not flat, different points on the baseball move across the scene at different rates. For example, the center of the baseball, which is closer to the camera than the edges, across the scene at a faster velocity than the edges of the baseball, which are further away from the camera.

With the use of a depth map for the baseball layer, the distance from the camera of the various points in the layer would be known. Thus, the information in the depth map could be applied to the image by some defined function rather than by an additive correction. It should be understood that, in the simple example given here, the different velocities of the various points on the baseball can be dealt with in the velocity map since the motion of the various points on the baseball comprise a smooth vector field.

However, depth maps would be particularly useful in situations where multiple objects have the same motion but are at different physical depths in the image such that the different objects have different orders of occlusion with respect to other layers. In this situation, a depth map would allow for all of the objects having identical motion to be encoded as a single layer which could be weaved over and under other layers when occlusions occur. Without depth maps, the objects might initially be coded as a single layer. However, every time a partial occlusion occurred (i.e., one of the objects in a first layer was occluded by objects in a second layer while other objects in the first layer occluded objects in the second layer, or vice versa), the layer would have to be broken into multiple layers.

The time-dependent maps, such as the velocity, delta, and contrast maps, allow for greatly increased coding efficiency because they eliminate the need for an entire new set of maps, or a large amount of corrective data, for each frame. For instance, a simple image sequence might be represented by a single intensity map for each layer along with a single velocity and attenuation map for layers which are in motion. It can be seen from the example used in FIG. 4 that the sequence of three frames of a ball moving across a stationary background can be represented by two intensity maps, a single attenuation map, and a single velocity map.

Several special cases are worth mentioning, as they can be very easily encoded with the present invention using a minimum amount of memory space. For instance, a shadow moving over a surface can be represented as a separate, purely multiplicative layer, that is, a layer with non-zero values in the attenuation map but zero values for its intensity map. Conversely, a specular reflection such as a reflection in a window can be represented as a separate, purely additive layer, with non-zero values in its intensity map and constant value for its attenuation map. Further, the change in contrast such as occurs with a fade in or fade out or with changes in lighting can be expressed in terms of a separate layer with a zero valued intensity map and a time varying attenuation type map, i.e., the contrast change map.

Special Effects

The technique of the present invention is particularly useful for time interpolation between frames, so as to allow for easy frame rate conversion. In this technique, where temporal changes are encoded in separate maps, it is a simple matter to interpolate such maps smoothly to any intermediate time. Accordingly, it is easy to synthesize intermediate frames from an image sequence represented at one frame rate to produce an image sequence in a different frame rate. For example, if a television image recorded in Europe at 50 Hz must be converted to 60 Hz for American television, the frame rate can be easily converted when using the representation technique of the present invention. In such a situation, all of the time-dependent maps must be interpolated by the same interpolation function to achieve the rate conversion. Representation of a map in memory as a continuous function as opposed to an array makes it particularly easy to interpolate both in time and in resolution.

Special effects can be accomplished by changing the time-dependent maps of certain layers while not changing those of other layers. Accordingly, motion of an object across a scene can be changed without changing the remainder of the scene.

The encoding process of the present invention may also be extremely useful for accomplishing "matting" as is commonly done by more costly and inconvenient means in the motion picture and television industries. In matting, an actor is filmed in front of a blue screen. Later, all blue pixels are classified as belonging to the background and all non-blue pixels are classified as belonging to the foreground. It is then possible to paste the image of the actor onto a different background. The present invention can be used to perform matting without the need for a blue screen. Using the present invention, the maps associated with a layer or set of layers from one image can be combined with the maps associated with a layer or set of layers from another image to accomplish matting. Accordingly, it would no longer be necessary to create artificially controlled environments in which the actors perform. Instead, the actors can perform anywhere and the background can be removed and substituted from the recorded image at a later time using the present invention.

Similar to the above-described matting situation, maps for layers can be computer-generated (as opposed to actually being obtained by recording a real life event) and then added into another image. In this manner, objects can be added to previously recorded images.

It is also possible to delete objects from previously recorded images by simply deleting the maps corresponding to the layers corresponding to those objects during the decoding process.

The information content of an image sequence represented in the representation format of the present invention can be used to extrapolate a larger image of the scene than was recorded in any single frame. For instance, where a camera pans over a stationary scene, each frame comprises a portion of the scene. The cumulative information of each frame can be used to construct a lattice comprising the larger scene. Any portion of the scene can be later displayed by specifying the portion of the lattice that it is desired to show. In this manner, particular frame images can be generated that were never actually recorded.

Figure 7A:
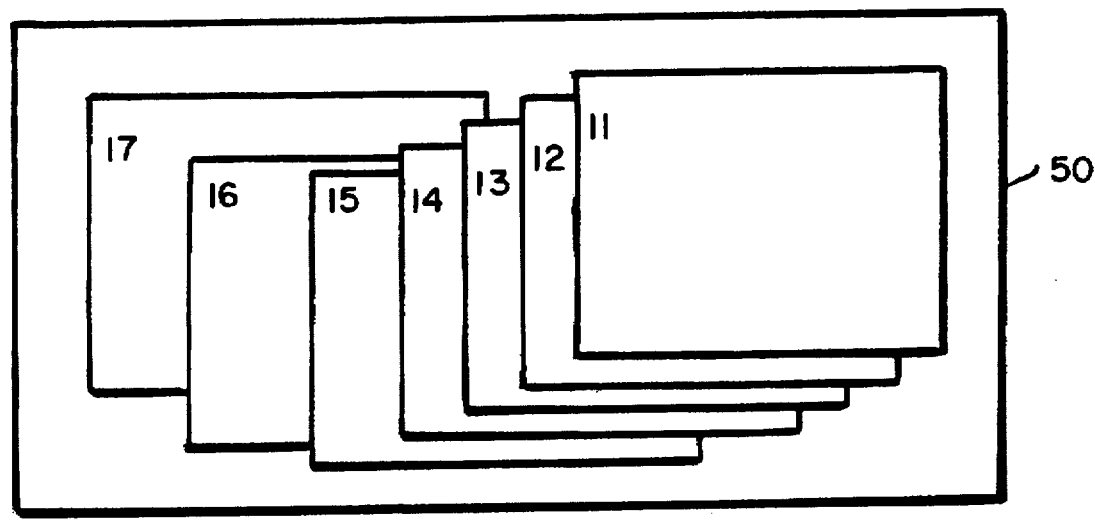
FIG. 7A is an illustration of a series of frame images obtained by a camera panning over a larger scene.
Figure 7B:
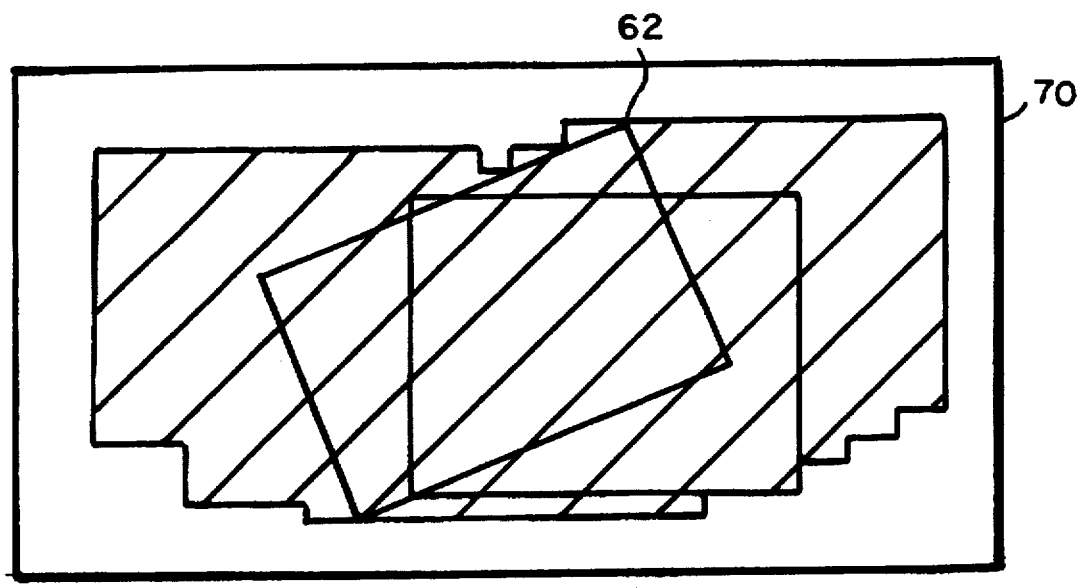
FIG. 7B is a pictorial illustration of the image information obtained from the frames illustrated in FIG. 7A.

FIGS. 7A and 7B illustrate the above-described concept. FIG. 7A shows seven consecutive images, frames $I_1$–$I_7$, recorded by a camera which panned over a stationary scene 50 which is larger than any individual scene. The cumulative information collected from the scene is shown by shaded portion 60 in FIG. 7B. With the cumulative information stored as a lattice, any portion of the scene can be re-created and is not limited to any one of the actual frames $I_1$ through $I_7$. For instance, the image shown framed by frame 62 could be generated even though the camera never actually recorded that particular image in a single frame. Such an image may even include motion extrapolated from other frames.

Figure 8:
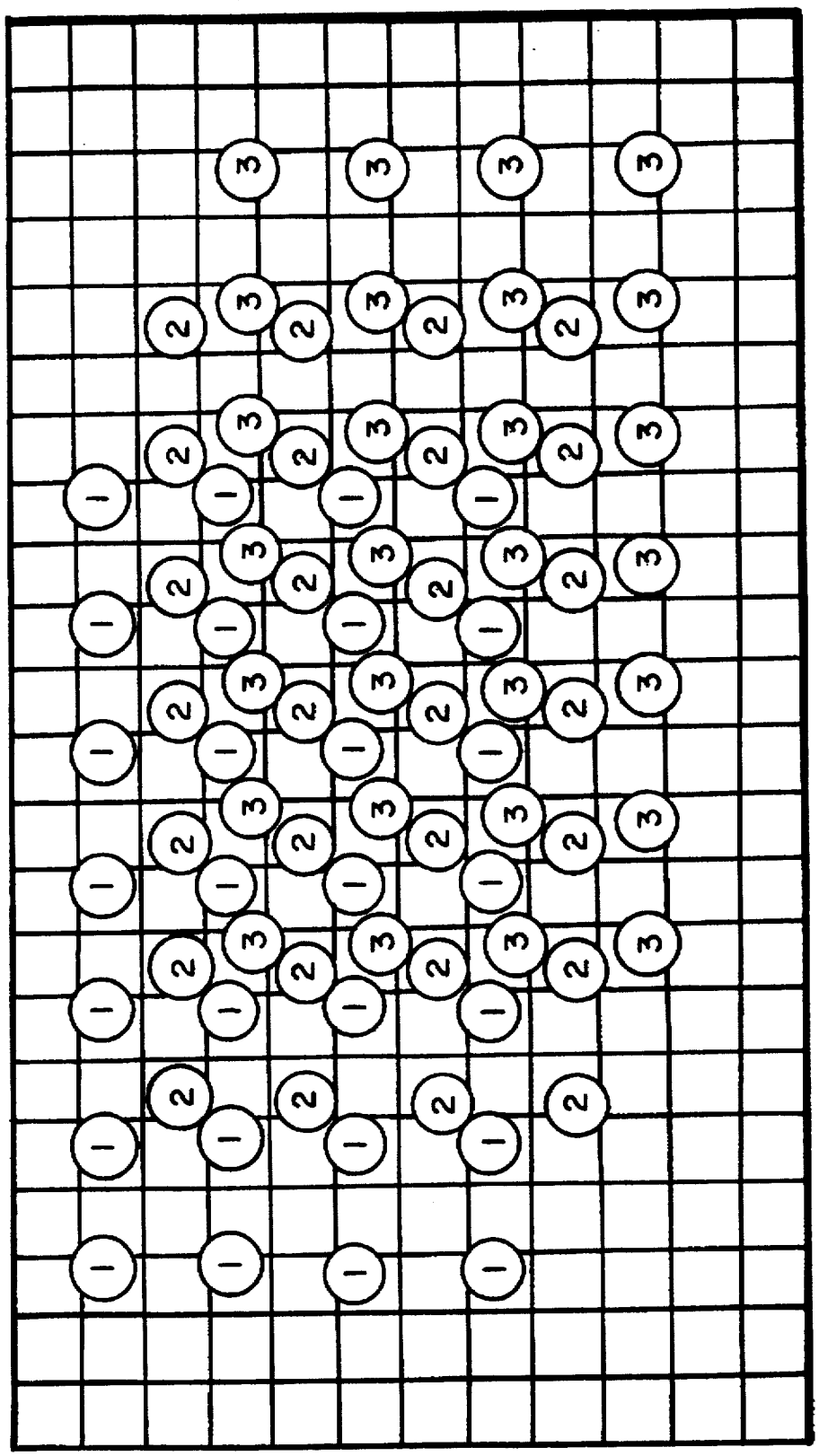
FIG. 8 illustrates an exemplary lattice of data points which may be obtained by panning a camera over a scene as illustrated in FIGS. 7A and 7B.

In the case of storing an image larger than any single recorded frame, the sampling lattice will have a certain resolution. The pixels of the incoming images generally will not align precisely with each other. For example, FIG. 8 comprises a selected rectangular lattice 70 for a large scene. The incoming samples from frames 1, 2 and 3 are likely to fall at intermediate positions on the lattice and not to correspond exactly with the lattice points or with each other. Such offset must be accounted for. In this situation, it is advantageous to think of the lattice as a continuous function that is represented by a set of samples and to think of the incoming data as having been acquired from a continuous signal by a sampling process. One can define a method for estimating the correct layer sample values given the set of observed image samples by an averaging technique.

It is also frequently possible to generate a layer with higher spatial resolution than any of the individual images, especially where the camera system is spatially under-sampled (as in interlace), or has some degree of aliasing (as in a CCD array). To display a particular frame of the larger image, samples must be taken from the lattice. However, as in the above-discussed situation, samples may fall on intermediate positions, in which case it will be necessary to use a form of interpolation to generate the image. Popular methods such as bicubic interpolation may be used.

In a somewhat similar situation, different frames in a frame sequence may have different degrees of resolution. It may be preferable to retain the highest resolution possible at each point in space and time. In this case, the information can be stored by the method described in U.S. Pat. No. 4,661,986 issued to Adelson. Briefly, a Laplacian pyramid is built from each image, and the pyramid coefficient from the different images are compared. The coefficient with the is rest deviation from zero is retained. Although the U.S. Pat. No. 4,661,986 describes a method in the context of Laplacian pyramids, the method can also be used with sub-band representation such as pyramids using quadrature mirror filters, wavelets, or steerable filters. It might also be used with non-sub-sampled representations. It is further possible that, rather than using the coefficient value as the selection criterion, the local energy measure computed for each position in the sub-band can be used. Temporal median filtering is another possibility.

In complex images having complex motion, the layering technique of the present invention may not necessarily result in data compression since it may not be possible to represent complex motions over multiple frames with a single temporally varying map (e.g., velocity map, contrast map, or delta map). Accordingly, the present invention preferably is used in conjunction with other data compression techniques. For instance, each of the maps used in the layers can be compressed using standard image coding techniques such as transform coding or sub-band coding. Many of the maps will be significantly compressed in this manner. For example, velocity maps will frequently be of low spatial resolution, and, therefore, will be greatly compressed. In some cases, the velocity map may be a simple warp for an entire layer, and thus can be represented by a few parameters. Also, the values in attenuation maps will frequently comprise mainly 1's or 0's in most places and intermediate values in only a few locations. Accordingly, the attenuation maps are likely to be greatly compressed also.

In addition, it is possible to encode maps in terms of each other. For example, a blur map can often be computed if one knows the velocity map, the effective shutter duration of the camera, the focus of the camera and the depth of the layer. In these cases, some of the maps can be encoded with a slight amount of data.

It is extremely important to know and maintain the depth of each layer relative to the other layers so that the image may be decoded in correct order. Also, in certain instances, it will be necessary to add layers between other layers or split a single layer into two layers intermediate a frame sequence, such as when a new object enters a scene or a previously stationary object begins to move, respectively. Slow movements can be encoded as warps of a single layer plus an error map to account for the occlusions and disocclusions. However, faster moving objects should be split into different layers.

Comparison With Prior Art

Figure 9:
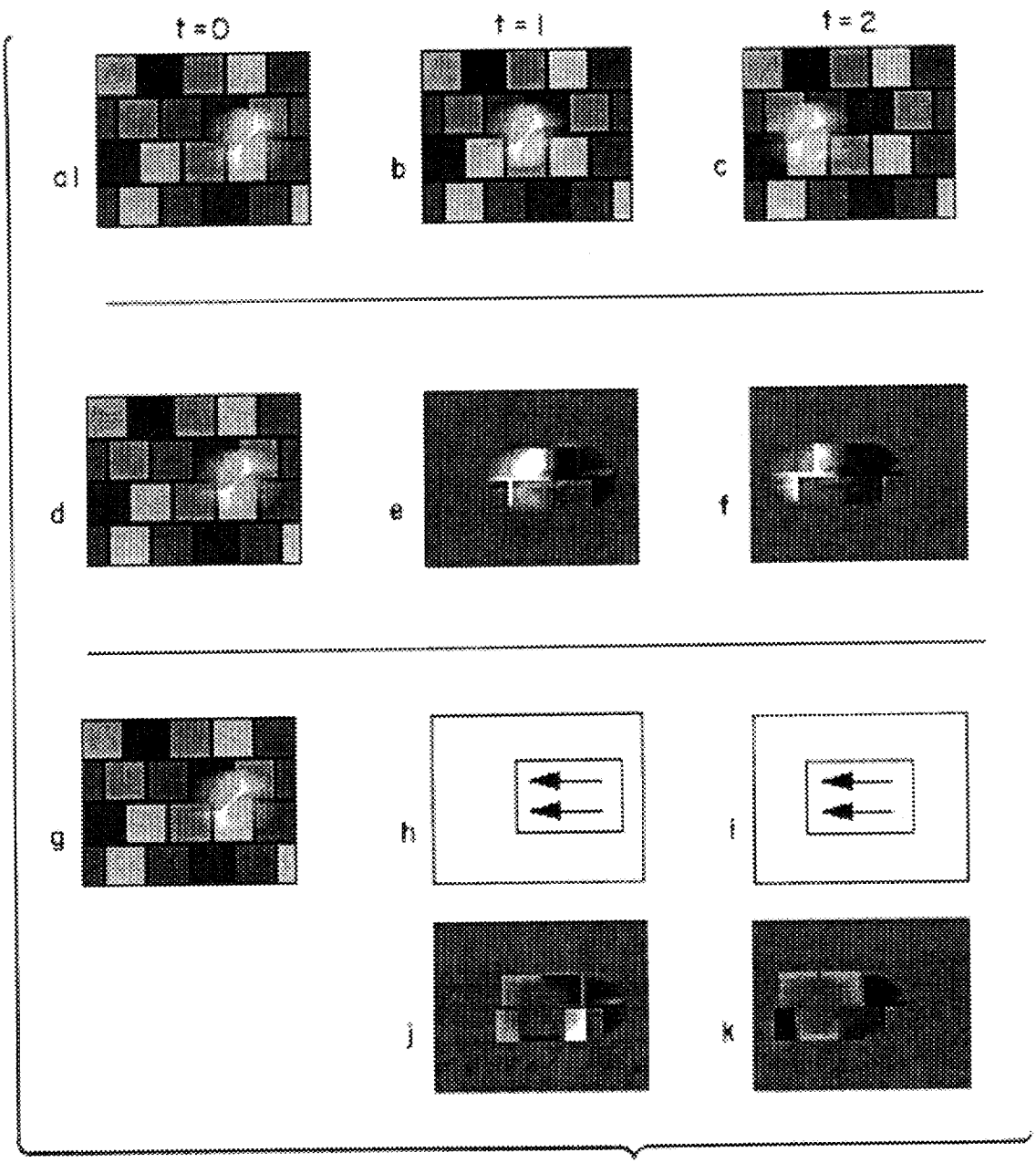
FIG. 9 is a series of visual representations illustrating prior art image representation techniques.

A comparison of the layering technique of the present invention with conventional prior art approaches illustrates some of the advantages of the present invention over those approaches. In FIG. 9, frames a, b and c illustrate the image sequence at times t=0, t=1 and t=2 which it is desired to encode. Frames d, e and f illustrate the prior art frame difference method of generating the image sequence. Frame a is encoded as illustrated by frame d. Each subsequent frame is encoded as a difference from the first frame as illustrated by frames e and f.

Another prior art method, the motion-compensated method, is shown by frames g, h, i, j, and k. As in the frame difference method, the initial frame is encoded as illustrated by frame g. The motion in the figure is encoded as rigid translation of a block of pixels in each subsequent frame, as shown in frames h and i. Finally, an error image is generated for each frame to correct for the failures of the rigid translation model as illustrated in frames j and k.

Neither the frame-differencing method nor the motion-compensating method, before error correction, generates a particularly accurate model of the image. Accordingly, the amount of corrective information that must be sent for each frame is quite large.

The layered representation technique of the present invention provides more efficient encoding of images in many instances. The present invention will have its greatest advantage in situations where an initial set of maps accurately represents the image information over many frames.

Further, neither the frame differencing method nor the motion compensated method allows for easy temporal interpolation between frames. In these methods, scaled corrective signals can be generated to attempt to synthesize intermediate frames but, for instance, in the motion-compensated technique, this will lead to "ghosting". The layered format of the present invention avoids such artifacts.

The present invention is also easily convertible to many, if not all, prior art representation formats. For example, an image in the present invention may be converted into a single layer and a single intensity map image for each frame, in which case it would be compatible with a simple still-image coding system in which each frame is individually coded. Obviously, the present invention would offer no advantage in this particular case, however, it would be compatible from the standpoint of image transmission format.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is byway of example only, and not limiting. The invention is limited only as defined in the following claims and equivalents thereto.

What is claimed is:

1. A apparatus for generating a digital representation of a two-dimensional image sequence recorded in a plurality of frames, comprising:

data processing means for encoding said image sequence, including means for separating said image sequence into a plurality of layers, wherein each layer corresponds to at least a portion of at least one object in an image in said sequence, and if said at least one object includes an occulted portion, said layer also includes at least part of said occulted portion, means for generating an intensity map corresponding to each layer, each intensity map at least partially describing said layer at a fixed point in time, means for generating at least one attenuation map, each attenuation map corresponding to a layer and describing a manner of attenuating points in the intensity maps of layers underlying said corresponding layer, and means for ordering said layers in terms of each layer's depth in said image;

memory means for storing said intensity maps and said attenuation maps;

said data processing means further comprising means for generating a velocity map associated with a layer of said image, said velocity map at least partially describing how the intensity map and attenuation map, if any, of the associated layer is warped as a function of time;

said data processing means further comprising means for generating a delta map associated with a layer of said image, said delta map describing a temporal change of locations in the intensity map of the associated layer; and said velocity map of said corresponding layer, if any, also describing how said delta map is transformed as a function of time.

2. An apparatus as set forth in claim 1 wherein said data processing means further comprises means for generating a depth map associated with a layer, said depth map describing the distance of points in said associated layer from a fixed plane parallel to said two-dimensional image sequence.

3. An apparatus as set forth in claim 2 wherein at least one of said various means for generating maps defines at least one of said maps as a continuous function of coordinates of said two dimensions, which function defines the values of a two dimensional array of points.

4. An apparatus as set forth in claim 3 wherein at least one of said various means for generating said maps defines at least one of said maps as a two-dimensional array of data points.

5. An apparatus as set forth in claim 2 wherein said data processing means further comprises:
   means for generating a contrast change map associated with a layer of said image, said contrast change map describing a change in contrast of said intensity map of said associated layer as a function of time,
   means for generating a blur map associated with a layer of said image, said blur map describing a space variant filter which describes blur in said intensity map of said associated layer, and
   means for generating a surface orientation map associated with a layer of said image, said surface orientation map describing surface normals of said intensity map of said associated layer.

6. An apparatus as set forth in claim 5 wherein each of said various means for generating maps defines at least one of said maps as a continuous function of coordinates of said two dimensions, which function defines the values of two dimensional array of points.

7. An apparatus as set forth in claim 6 wherein each of said various means for generating maps defines at least one of said maps as a two-dimensional array of data points.

8. An apparatus as set forth in claim 7 wherein individual ones of said various maps have different dimensions.

9. An apparatus as set forth in claim 7 wherein individual ones of said various maps have different resolutions.

10. An apparatus as set forth in claim 9 wherein each of said various means for generating maps further comprise means for temporal median filtering said maps in order to generate a map of higher resolution than said frames.

11. An apparatus as set forth in claim 9 wherein each of said various means for generating maps further comprise means for performing a Laplacian pyramid combination on said maps in order to generate a map of higher resolution than said frames.

12. An apparatus as set forth in claim 7 wherein different ones of said velocity and contrast change maps are defined as a function of different frame rates.

13. An apparatus as set forth in claim 7 wherein each of said various means for generating maps further comprise data compression means for reducing the quantity of data stored in memory for each map.

14. An apparatus as set forth in claim 7 wherein at least one of said intensity maps at least partially defines an image larger than the image of any single frame of said image sequence.

15. An apparatus as set forth in claim 7 further comprising means for generating an intensity map and an attenuation map corresponding to a layer for an object which does not appear in the recorded image sequence, whereby an object may be added to said image sequence upon decoding.

16. An apparatus as set forth in claim 7 wherein said means for decoding further includes means for temporally interpolating a velocity map whereby a velocity of an object in said image sequence can be altered without altering the frame rate.

17. The apparatus of claim 1 wherein each of said various means for generating maps further comprises data compression means for reducing the quantity of data stored in said memory means for one or more maps.

18. An apparatus for encoding a first two-dimensional image sequence comprising at least one frame into a digital representation and decoding said digital representation into a second two-dimensional image sequence comprising at least one frame, said apparatus comprising:
   data processing means for encoding said image sequence, including
      means for separating said image sequence into a plurality of layers, wherein each layer corresponds to at least a portion of at least one object in an image in said sequence, and if said at least one object includes an occulted portion, said layer also includes at least part of said occulted portion,
      means for generating an intensity data map corresponding to each layer, each data map describing at least partially said layer at a fixed point time in time,
      means for generating at least one attenuation map, each attenuation map corresponding to a layer and describing a manner of attenuating points in the intensity maps of layers underlying said corresponding layer, and
      means for ordering said layers in terms of each layer's depth in said image; memory means for storing said intensity maps and said attenuation maps;
   decoding means for combining said various maps so as to generate said second two-dimensional image sequence based on said first two-dimensional image sequence;
   said data processing means comprising means for generating a velocity map associated with a layer of said image, said velocity map at least partially describing how the intensity map and attenuation map, if any, of the corresponding layer is warped as a function of time;
   said data processing means further comprising means for generating a delta map ciated with a layer of said image, said delta map describing a temporal change of the points in the intensity map of the corresponding layer; and
   said velocity map of said corresponding layer, if any, also describing how said delta map is transformed as a function of time.

19. An apparatus as set forth in claim 18 wherein said decoding means comprises:
   means for adding each delta map to the intensity map of the corresponding layer to produce a first sum,
   means for warping each said first sum by the velocity map of the corresponding layer to produce a warped intensity map,
   means for warping each attenuation map by the velocity map of the corresponding layer to produce a warped attenuation map,
   means for multiplying each said warped intensity map by the complement of the warped attenuation map of the corresponding layer to produce a first product,
   means for multiplying each warped intensity map by the warped attenuation map corresponding to every layer which overlies the layer corresponding to said warped intensity map to produce a second product for each layer for which there is an overlying layer, and
   means for adding each said second product to the first product of the immediately overlying layer.

20. An apparatus as set forth in claim 19 wherein said first image sequence is of a first frame rate and wherein said apparatus further comprises means for interpolating said velocity and delta maps, whereby the frame rate of said second image sequence is different than said first frame rate.

21. The apparatus of claim 18 wherein each of said various means for generating maps further comprises data compression means for reducing the quantity of data stored in said memory means for one or more maps.

22. A method for encoding a first two-dimensional image sequence recorded in a plurality of frames into a digital representation and decoding said digital representation into a second image sequence, comprising the steps of:

separating said image into a plurality of layers, wherein each layer corresponds to at least a portion of at least one object in an image in said sequence, and if said at least one object includes an occulted portion, said layer also includes at least part of said occulted portion;

generating an intensity map corresponding to each layer, each intensity map at least partially describing said layer as a two-dimensional matrix of points at a fixed point in time;

ordering said layers in terms of each layer's depth in said image;

generating at least one attenuation map, each attenuation map corresponding to a layer and describing a manner of attenuating points in the intensity maps of layers underlying the corresponding layer;

combining said maps to produce said second image sequence;

one or more of said steps of generating a map further comprising performing a data compression on data comprising one or more of the maps generated in said one or more steps in order to reduce the quantity of data in said one or more maps;

generating a velocity map associated with a layer of said image, said velocity map at least partially describing how the intensity map and attenuation map, if any, of the corresponding layer is transformed as a function of time; and generating a delta map associated with a layer of said image, said delta map describing a temporal change of locations in the intensity map of the corresponding layer.

23. A method as set forth in claim 22 wherein said step of ordering said layers comprises generating a depth map.

24. A method as set forth in claim 22 wherein said step of combining said maps comprises:

generating a complement of each attenuation map, multiplying each intensity map by the complement of the attenuation map of the corresponding layer to produce a first product, multiplying each intensity map by the attenuation map of every layer overlying said layer of said intensity map to produce a plurality of second products, and adding each said second product to the first product of the immediately overlying layer.

25. A method as set forth in claim 22 wherein said step of combining said maps further comprises:

adding each delta map to the intensity map of the corresponding layer to produce a first sum, warping each said first sum by the velocity map of the corresponding layer to produce a warped intensity map, warping each attenuation map by the velocity map of the corresponding layer to produce a warped attenuation map, multiplying each said warped intensity map by the complement of the warped attenuation map of the corresponding layer to produce a first product, multiplying each warped intensity map by the warped attenuation map corresponding to every layer which overlies the layer corresponding to said warped intensity map to produce a second product for each layer for which there is an overlying layer, and adding each said second product to the first product of the immediately overlying layer.

26. A method as set forth in claim 25 further comprising the steps of:

generating a contrast change map associated with a layer of said image, said contrast change map describing a change in contrast of the intensity map of the corresponding layer as a function of time, generating a blur map associated with a layer of said image, said blur map describing a space variant filter which describes blur in an intensity map of the corresponding layer, and generating a surface orientation map associated with a layer of said image, said surface orientation map describing surface normals of an intensity map of the corresponding layer.

27. A method for encoding a first two-dimensional image sequence recorded in a plurality of frames into a digital representation and decoding said digital representation into a second image sequence, comprising the steps of:

separating said image into a plurality of layers, wherein each layer corresponds to at least a portion of at least one object in an image in said sequence, and if said at least one object includes an occulted portion, said layer also includes at least part of said occulted portion;

generating an intensity map corresponding to each layer, each intensity map at least partially describing said layer as a two-dimensional matrix of points at a fixed point in time;

ordering said layers in terms of each layer's depth in said image;

generating at least one attenuation map, each attenuation map corresponding to a layer and describing a manner of attenuating points in the intensity maps of layers underlying the corresponding layer;

combining said maps to produce said second image sequence;

one or more of said steps of generating a map further comprising performing a data compression on data comprising one or more of the maps generated in said one or more steps in order to reduce the quantity of data in said one or more maps;

generating a velocity map associated with a layer of said image, said velocity map at least partially describing how the intensity map and attenuation map, if any, of the corresponding layer is transformed as a function of time; and said first image sequence being of a first frame rate and the step of combining said maps further including interpolating said velocity maps, whereby the frame rate of said second image sequence is different than the frame rate of said first image sequence.

* * * * *